(12) United States Patent
Walsh

(10) Patent No.: US 10,746,051 B2
(45) Date of Patent: Aug. 18, 2020

(54) HYBRID WET-DRY FACE SEAL SEAT

(71) Applicant: United Technologies Corporation, Farmington, CT (US)

(72) Inventor: Martin J. Walsh, Farmington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 139 days.

(21) Appl. No.: 16/138,071

(22) Filed: Sep. 21, 2018

(65) Prior Publication Data
US 2020/0095891 A1    Mar. 26, 2020

(51) Int. Cl.
  F01D 25/18   (2006.01)
  F01D 25/12   (2006.01)
  F16J 15/34   (2006.01)

(52) U.S. Cl.
  CPC .......... F01D 25/183 (2013.01); F01D 25/12 (2013.01); F16J 15/3404 (2013.01); F01D 25/125 (2013.01); F05D 2240/50 (2013.01); F05D 2240/55 (2013.01); F16J 15/342 (2013.01)

(58) Field of Classification Search
  CPC ...... F01D 11/003; F01D 25/12; F01D 25/183; F16J 15/162; F16J 15/3404; F16J 15/342; F02C 7/28; F05D 2240/55
  See application file for complete search history.

(56) References Cited

U.S. PATENT DOCUMENTS

| | | | | |
|---|---|---|---|---|
| 2,857,182 A | * | 10/1958 | Bain | F16J 15/38 277/401 |
| 2,992,842 A | * | 7/1961 | Shevchenko | F01D 11/003 277/306 |
| 3,025,115 A | * | 3/1962 | Shevchenko | F01D 11/003 384/481 |
| 3,915,521 A | * | 10/1975 | Young | F16C 33/586 384/467 |
| 4,123,069 A | * | 10/1978 | Sato | F16J 15/162 277/391 |
| 4,406,459 A | * | 9/1983 | Davis | F16J 15/3404 277/401 |
| 4,406,460 A | * | 9/1983 | Slayton | F16J 15/164 277/401 |
| 4,928,978 A | * | 5/1990 | Shaffer | F01D 25/183 277/401 |
| 5,133,562 A | * | 7/1992 | Lipschitz | F16J 15/342 277/400 |

(Continued)

Primary Examiner — Nicholas L Foster
(74) Attorney, Agent, or Firm — Snell & Wilmer LLP

(57) ABSTRACT

A wet-dry face seal seat includes a main body having a mating face configured to mate with a sealing member and an outer diameter surface, and defining a pool feed passage that extends to the mating face and a cooling hole that extends to the outer diameter surface. The wet-dry face seal seat further includes an oil capture scoop extending from the main body and defining an oil volume radially inward from the oil capture scoop and in fluid communication with the pool feed passage and the cooling hole, the oil capture scoop having a radial distance that allows oil to flow through the cooling hole in response to oil flow from an oil jet being below a threshold value and through the pool feed passage in response to the oil flow from the oil jet reaching or exceeding the threshold value.

20 Claims, 4 Drawing Sheets

(56) References Cited

U.S. PATENT DOCUMENTS

| | | | | |
|---|---|---|---|---|
| 5,464,227 | A | * | 11/1995 | Olson .................. F16J 15/3404 |
| | | | | 277/400 |
| 5,593,165 | A | * | 1/1997 | Murray ................ F01D 11/003 |
| | | | | 277/543 |
| 5,622,438 | A | * | 4/1997 | Walsh .................. F01D 25/162 |
| | | | | 384/624 |
| 5,639,096 | A | * | 6/1997 | Ullah .................. F16J 15/3404 |
| | | | | 277/401 |
| 6,109,617 | A | * | 8/2000 | Laney .................. F16J 15/3484 |
| | | | | 277/369 |
| 6,196,790 | B1 | * | 3/2001 | Sheridan ............... F01D 11/003 |
| | | | | 415/111 |
| 7,730,866 | B2 | | 6/2010 | Melchior |
| 8,308,426 | B2 | * | 11/2012 | Cigal .................. F16C 33/6677 |
| | | | | 415/111 |
| 8,464,835 | B2 | * | 6/2013 | Munson .................. F01D 25/16 |
| | | | | 184/6.11 |
| 9,777,607 | B2 | | 10/2017 | Nagata et al. |
| 9,909,438 | B2 | * | 3/2018 | Duffy .................... F01D 11/003 |
| 10,174,629 | B1 | * | 1/2019 | Valva .................... F01D 11/003 |
| 10,352,456 | B2 | * | 7/2019 | Amador ................. F16J 15/342 |
| 10,422,245 | B2 | * | 9/2019 | Cigal .................. F16J 15/3404 |
| 2012/0027570 | A1 | * | 2/2012 | Cigal ...................... F01D 25/18 |
| | | | | 415/110 |
| 2014/0119887 | A1 | * | 5/2014 | Lyle ...................... F01D 11/005 |
| | | | | 415/110 |
| 2015/0152746 | A1 | * | 6/2015 | Maret .................. F01D 25/186 |
| | | | | 415/1 |
| 2016/0273657 | A1 | * | 9/2016 | Amador ................. F16J 15/342 |
| 2017/0292394 | A1 | * | 10/2017 | Duffy .................... F01D 11/003 |
| 2018/0283210 | A1 | * | 10/2018 | Cigal ...................... F01D 25/12 |

\* cited by examiner

HYBRID WET-DRY FACE SEAL SEAT

FIELD

The present disclosure relates generally to gas turbine engines and, more particularly, to face seals for sealing static to rotating interfaces.

BACKGROUND

Gas turbine engines include compressor sections to compress an airflow, combustor sections that combine the airflow with fuel for combustion and generate exhaust, and turbine sections that convert the exhaust into torque to drive the compressor sections. Gas turbine engines may include static to rotating interfaces, such as near bearing compartments, around shafts, or the like. It may be desirable to occasionally provide sealing at these interfaces. Such sealing may be relatively difficult due to heat generated by friction between the static component and the rotating component. Furthermore, it is desirable to reduce oil leakage at such seal locations.

SUMMARY

Described herein is a wet-dry face seal seat configured to rotate about an axis. The wet-dry face seal seat includes a main body having a mating face configured to mate with a sealing member and an outer diameter surface, and defining a pool feed passage that extends to the mating face and a cooling hole that extends to the outer diameter surface. The wet-dry face seal seat further includes an oil capture scoop extending from the main body and defining an oil volume radially inward from the oil capture scoop and in fluid communication with the pool feed passage and the cooling hole, the oil capture scoop having a radial distance that allows oil to flow through the cooling hole in response to oil flow from an oil jet being below a threshold value and through the pool feed passage in response to the oil flow from the oil jet reaching or exceeding the threshold value.

In any of the foregoing embodiments, the oil capture scoop includes an axial portion extending away from the main body and a radial portion extending radially inward from the axial portion.

In any of the foregoing embodiments, the oil volume is defined by the axial portion of the oil capture scoop, the radial portion of the oil capture scoop, and an axial face of the main body.

In any of the foregoing embodiments, the axial face of the main body defines a pool feed inlet in fluid communication with the pool feed passage, and the axial portion of the oil capture scoop defines a cooling inlet in fluid communication with the cooling hole.

In any of the foregoing embodiments, the main body defines an oil pool on the mating face in fluid communication with the pool feed passage.

In any of the foregoing embodiments, the pool feed passage includes a pool feed hole extending from the oil volume to the oil pool, and a pool discharge hole extending from the oil pool to the outer diameter surface.

In any of the foregoing embodiments, the wet-dry face seal seat is configured for use in a gas turbine engine.

In any of the foregoing embodiments, the main body and the oil capture scoop include at least one of a metallic material, a non-metallic material, or a hybrid metallic and non-metallic material.

In any of the foregoing embodiments, the oil flow from the oil jet increases in response to a rotational velocity of the wet-dry face seal seat increasing.

Also disclosed is a wet-dry face seal seat configured to rotate about an axis. The wet-dry face seal seat includes a main body having a mating face configured to mate with a sealing member, an outer diameter surface, and an axial face, the main body defining a pool feed passage that extends to the mating face and a cooling hole that extends to the outer diameter surface. The wet-dry face seal seat further includes an oil capture scoop having an axial portion extending away from the main body, and a radial portion extending radially inward from the radial portion, the axial portion of the oil capture scoop, the radial portion of the oil capture scoop, and the axial face of the main body defining an oil volume, the axial face of the main body further defining a pool feed inlet in fluid communication with the pool feed passage, and the axial portion of the oil capture scoop defining a cooling inlet in fluid communication with the cooling hole.

In any of the foregoing embodiments, a distance between the axial portion of the oil capture scoop and the pool feed inlet along with the cooling inlet being located on the axial portion allows oil to flow through the cooling hole in response to oil flow from an oil jet being below a threshold value and through the pool feed passage in response to the oil flow from the oil jet reaching or exceeding the threshold value.

In any of the foregoing embodiments, the oil flow from the oil jet increases as a rotational velocity of the wet-dry face seal seat increases.

In any of the foregoing embodiments, the main body defines an oil pool on the mating face in fluid communication with the pool feed passage.

In any of the foregoing embodiments, the pool feed passage includes a pool feed hole extending from the oil volume to the oil pool, and a pool discharge hole extending from the oil pool to the outer diameter surface.

In any of the foregoing embodiments, the wet-dry face seal seat is configured for use in a gas turbine engine.

In any of the foregoing embodiments, the main body and the oil capture scoop include at least one of a metallic material, a non-metallic material, or a hybrid metallic and non-metallic material.

Also disclosed is a wet-dry face seal. The wet-dry face seal includes a sealing member. The wet-dry face seal further includes a wet-dry face seal seat configured to rotate relative to the sealing member. The wet-dry face seal seat includes a main body having a mating face configured to mate with the sealing member, an outer diameter surface, and an axial face, the main body defining a pool feed passage that extends to the mating face and a cooling hole that extends to the outer diameter surface. The wet-dry face seal seat further includes an oil capture scoop having an axial portion extending away from the main body, and a radial portion extending radially inward from the radial portion, the axial portion of the oil capture scoop, the radial portion of the oil capture scoop, and the axial face of the main body defining an oil volume, the axial face of the main body further defining a pool feed inlet in fluid communication with the pool feed passage, and the axial portion of the oil capture scoop defining a cooling inlet in fluid communication with the cooling hole.

In any of the foregoing embodiments, a distance between the axial portion of the oil capture scoop and the pool feed inlet along with the cooling inlet being located on the axial portion allows oil to flow through the cooling hole in response to oil flow from an oil jet being below a threshold value and through the pool feed passage in response to the oil flow from the oil jet reaching or exceeding the threshold value.

In any of the foregoing embodiments, the main body defines an oil pool on the mating face in fluid communication with the pool feed passage, and the pool feed passage includes a pool feed hole extending from the oil volume to the oil pool, and a pool discharge hole extending from the oil pool to the outer diameter surface.

In any of the foregoing embodiments, the wet-dry face seal seat is configured for use in a gas turbine engine.

The foregoing features and elements are to be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Where used herein, the phrase "at least one of A or B" can include any of "A" only, "B" only, or "A and B."

Figure 1:
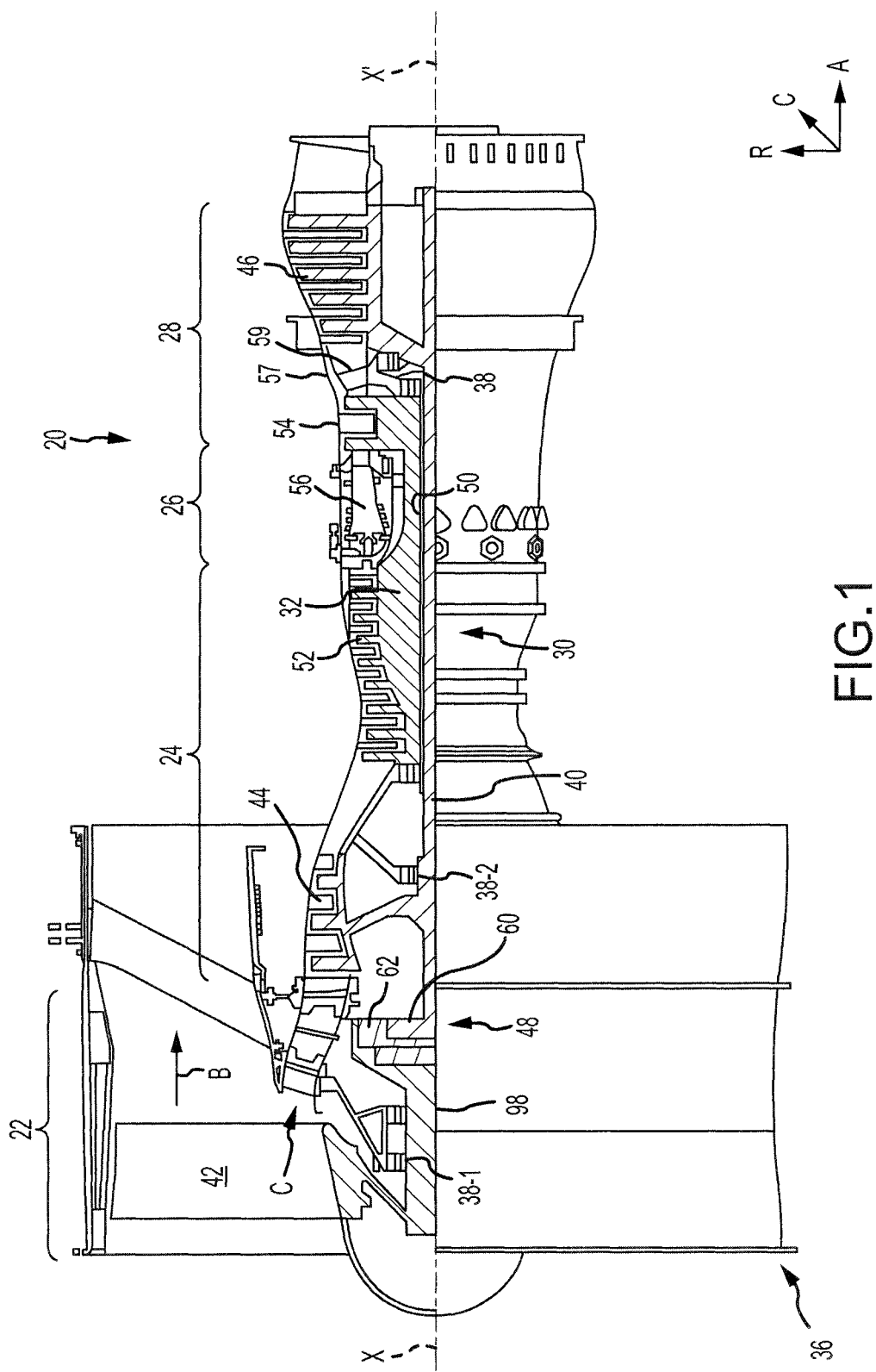
FIG. 1 is a cross-sectional view of an exemplary gas turbine engine, in accordance with various embodiments.

With reference to FIG. 1, a gas turbine engine 20 is provided. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As utilized herein, radially inward refers to the negative R direction and radially outward refers to the R direction. An A-R-C axis is shown throughout the drawings to illustrate the relative position of various components.

The gas turbine engine 20 may be a two-spool turbofan that generally incorporates a fan section 22, a compressor section 24, a combustor section 26 and a turbine section 28. In operation, the fan section 22 drives air along a bypass flow-path B while the compressor section 24 drives air along a core flow-path C for compression and communication into the combustor section 26 then expansion through the turbine section 28. Although depicted as a turbofan gas turbine engine 20 herein, it should be understood that the concepts described herein are not limited to use with turbofans as the teachings may be applied to other types of turbine engines.

The gas turbine engine 20 generally comprises a low speed spool 30 and a high speed spool 32 mounted for rotation about an engine central longitudinal axis X-X' relative to an engine static structure 36 via several bearing systems 38, 38-1, and 38-2. It should be understood that various bearing systems 38 at various locations may alternatively or additionally be provided, including for example, the bearing system 38, the bearing system 38-1, and the bearing system 38-2.

The low speed spool 30 generally includes an inner shaft 40 that interconnects a fan 42, a low pressure (or first) compressor section 44 and a low pressure (or second) turbine section 46. The inner shaft 40 is connected to the fan 42 through a geared architecture 48 that can drive the fan shaft 98, and thus the fan 42, at a lower speed than the low speed spool 30. The geared architecture 48 includes a gear assembly 60 enclosed within a gear housing 62. The gear assembly 60 couples the inner shaft 40 to a rotating fan structure.

The high speed spool 32 includes an outer shaft 50 that interconnects a high pressure (or second) compressor section 52 and the high pressure (or first) turbine section 54. A combustor 56 is located between the high pressure compressor 52 and the high pressure turbine 54. A mid-turbine frame 57 of the engine static structure 36 is located generally between the high pressure turbine 54 and the low pressure turbine 46. The mid-turbine frame 57 supports one or more bearing systems 38 in the turbine section 28. The inner shaft 40 and the outer shaft 50 are concentric and rotate via the bearing systems 38 about the engine central longitudinal axis X-X', which is collinear with their longitudinal axes. As used herein, a "high pressure" compressor or turbine experiences a higher pressure than a corresponding "low pressure" compressor or turbine.

The core airflow C is compressed by the low pressure compressor section 44 then the high pressure compressor 52, mixed and burned with fuel in the combustor 56, then expanded over the high pressure turbine 54 and the low pressure turbine 46. The mid-turbine frame 57 includes airfoils 59 which are in the core airflow path. The turbines 46, 54 rotationally drive the respective low speed spool 30 and high speed spool 32 in response to the expansion.

The gas turbine engine 20 is a high-bypass ratio geared aircraft engine. The bypass ratio of the gas turbine engine 20 may be greater than about six (6). The bypass ratio of the gas turbine engine 20 may also be greater than ten (10:1). The geared architecture 48 may be an epicyclic gear train, such as a star gear system (sun gear in meshing engagement with a plurality of star gears supported by a carrier and in meshing engagement with a ring gear) or other gear system. The geared architecture 48 may have a gear reduction ratio of greater than about 2.3 and the low pressure turbine 46 may have a pressure ratio that is greater than about five (5). The diameter of the fan 42 may be significantly larger than that of the low pressure compressor section 44, and the low pressure turbine 46 may have a pressure ratio that is greater than about five (5:1). The pressure ratio of the low pressure turbine 46 is measured prior to an inlet of the low pressure turbine 46 as related to the pressure at the outlet of the low pressure turbine 46. It should be understood, however, that the above parameters are exemplary of various embodiments of a suitable geared architecture engine and that the present disclosure contemplates other turbine engines including direct drive turbofans.

The next generation turbofan engines are designed for higher efficiency and use higher pressure ratios and higher temperatures in the high pressure compressor 52 than are conventionally experienced. These higher operating temperatures and pressure ratios create operating environments that cause thermal loads that are higher than the thermal loads conventionally experienced, which may shorten the operational life of current components.

Figure 2:
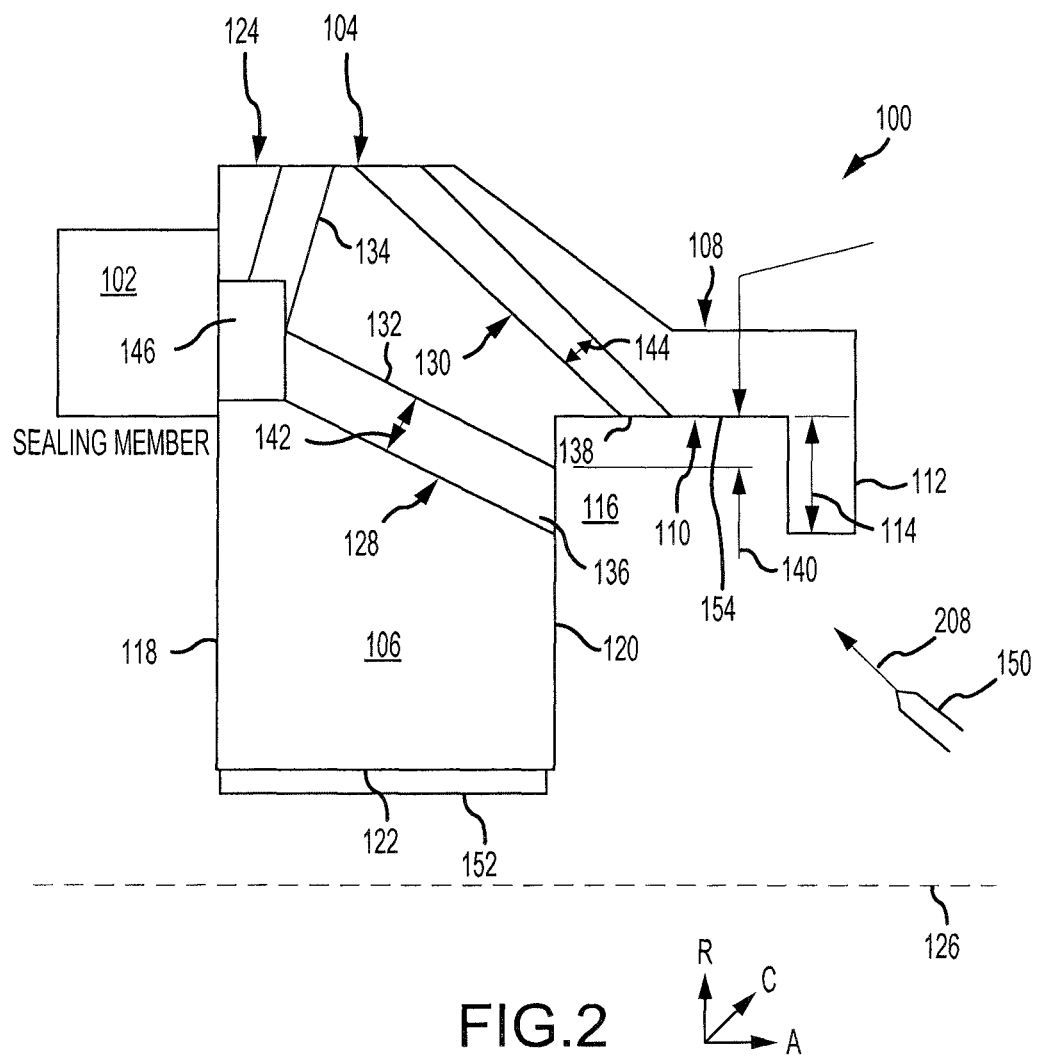
FIG. 2 illustrates a wet-dry face seal for sealing a static to rotating interface, in accordance with various embodiments.

Referring now to FIG. 2, a wet-dry face seal 100 may be used to seal a bearing, bearing compartment, or shaft in one or more bearing system 38 or other location of the gas turbine engine 20 of FIG. 1. The wet-dry face seal 100 may include a sealing member 102 and a wet-dry face seal seat 104. The wet-dry face seal seat 104 may rotate about an axis 126, and the sealing member 102 may remain stationary relative to the axis 126. In that regard, the wet-dry face seal 100 may be used to seal any rotating to static interfaces. The sealing member 102 may be loaded against the wet-dry face seal seat 104 such as, for example, via a spring, via air pressure, or the like.

In various embodiments, the sealing member 102 may include a carbon material, a carbon composite material, a plastic material (e.g., a thermoplastic or a thermoset), polytetrafluoroethylene (PTFE), or other material that provides a relatively low friction coefficient. In various embodiments, the wet-dry face seal seat 104 may include metallic materials such as steel, non-metallic materials such as ceramics or plastics, or metallic/non-metallic hybrid composite materials such as chromium carbide, or the like. In various embodiments, the sealing member 102 and the wet-dry face seal seat 104 may include any suitable materials.

The wet-dry face seal seat 104 may include a main body 106 and an oil capture scoop 108. The oil capture scoop 108 may include an axial portion 110 extending axially away from the main body 106 and a radial portion 112 extending radially inward from the axial portion 110.

The main body 106 may have an inner diameter surface 122, an outer diameter surface 124, a mating face 118, and an axial face 120. The mating face 118 is designed to mate with the sealing member 102. Stated differently, the mating face 118 is designed to contact the sealing member 102 to form a seal therebetween.

The inner diameter surface 122 may face radially inward, and the outer diameter surface 124 may face radially outward. In various embodiments, the inner diameter surface 122 may be oriented on an opposite side of the main body 106 from the outer diameter surface 124. In various embodiments, the axial face 120 may face in an axial direction, and may be oriented or situated on an opposite side of the main body 106 from the mating face 118.

The axial face 120 of the main body 106, the axial portion 110 of the oil capture scoop 108, and the radial portion 112 of the oil capture scoop 108 may define an oil volume 116. The oil volume 116 may receive oil from an oil jet 150.

The main body 106 may include a pool feed passage 128 that extends from a pool feed inlet 136 on the axial face towards an oil pool 146 defined by the main body 106. For example, the oil pool 146 may be defined on the mating face 118 and may include a cavity or volume in which oil may collect. In various embodiments, the pool feed passage 128 may include a pool feed hole 132 that extends from the axial face 120 to the oil pool 146, and a pool discharge hole 134 that extends from the oil pool 146 to the outer diameter surface 124. The oil from the oil pool 146 may cool the interface of the mating face 118 and the sealing member 102, and may reduce friction on this interface. In that regard, the oil from the oil pool 146 may spread along the mating face 118. In various embodiments, oil from the pool feed passage 128 may be directly ported to the mating face 118 without inclusion of an oil pool 146. A portion of the oil from the oil pool 146 may be ported through the pool discharge hole 134 towards the outer diameter surface 124.

The main body 106 may further include a cooling hole 130 that extends from a cooling inlet 138 towards the outer diameter surface 124. In various embodiments, the cooling inlet 138 may be defined by the axial portion 110 of the oil capture scoop 108. The cooling hole 130 may transfer or port oil or another fluid from the oil volume 116 through the wet-dry face seal seat 104 in order to cool the wet-dry face seal seat 104. The oil may exit the wet-dry face seal seat 104 from the cooling hole 130 on the outer diameter surface 124.

Heat may be generated at the interface between the sealing member 102 and the mating face 118. In that regard, the oil in the cooling hole 130 may transfer heat away from the wet-dry face seal seat 104.

Wet seals (that include pool feed passages) may provide superior durability relative to dry seals due to the decrease in friction at the interface. During engine operation, the air pressure in a first cavity 220, exterior to the bearing compartment 38, may be greater than air pressure in a second cavity 222, which is internal relative to the bearing compartment 38. However, conventional wet seals may undesirably leak oil between a mating face and a sealing member in response to relatively low differential air pressure across the seal 102. For example, such leakage may occur during starting and idle conditions of a corresponding gas turbine engine when the air pressure in the first cavity 220 is relatively low. This is because oil leakage is typically controlled by air pressure differential across the seal 102 (i.e., from an inner diameter surface to an outer diameter surface) which tends to be relatively low during starting and idle conditions.

The wet-dry face seal 100 is designed to provide the benefits of a wet seal without the detriments of the wet seal. The orientation of the oil capture scoop 108 provides this benefit by allowing oil to flow through the cooling hole 130 and not the pool feed passage 128 in response to the oil flow from the oil jet 150 being below a threshold value, and allowing the oil to flow through the pool feed passage 128 in response to the oil flow from the oil jet 150 reaching or exceeding the threshold value. The oil flow from the oil jet 150 may increase as rotational velocity of the wet-dry face seal seat 104 increases. The threshold value of oil flow may correspond to an engine power setting, such as idle, above which oil leakage between the sealing member 102 and the mating face 118 is relatively unlikely or nonexistent. This functionality may be at least partially provided by a radial distance 114 of the oil capture scoop 108 or a distance 140 from the axial portion 110 of the oil capture scoop 108. The radial distance 114 corresponds to a distance between the axial portion 110 and a radially inner end of the radial portion 112.

The flow of oil from the oil jet 150 may vary in proportion to engine power levels or shaft speed. In response to any rotation of the wet-dry face seal seat 104, oil from the oil jet 150 is received by an inner surface 154 of the axial portion 110, thus allowing oil to flow through the cooling hole 130 via the cooling inlet 138 at any rotational velocity of the wet-dry face seal seat 104. The pool feed inlet 136 is located a distance 140 from the axial portion 110 of the oil capture scoop 108 which reduces the likelihood of the pool feed inlet 136 receiving oil while the oil from the oil jet is below the threshold value. The distance 140 may be, for example, between 0.1 inches and 5 inches (2.54 millimeters (mm) and 127 mm, between 0.5 inches and 3 inches (12.7 mm and 76.2 mm), or between 1 inch and 3 inches (25.4 mm and 76.2 mm). In various embodiments, oil flow through the cooling hole 130 is constant in response to the oil flow from the oil jet 150 reaching or exceeding the threshold value.

A cooling diameter 144 of the cooling hole 130 may be selected such that all oil from the oil jet 150 flows through the cooling hole 130 in response to the oil flow from jet 150 being below the threshold value. As the engine power level is increased, oil flow from the oil jet 150 reaches or exceeds the threshold value, pressure on the inner diameter causes the oil to pool within the oil volume 116 such that it reaches the pool feed inlet 136 and flows through the pool feed passage 128. Stated differently, the flow of oil from jet 150 may exceed the flow capacity of the cooling hole 130. In that regard, the cooling diameter 144 and the distance 140 are selected such that the oil may flow through the pool feed passage 128 in response to the oil flow from the oil jet 150 reaching or exceeding the threshold value.

The cooling diameter 144 may be, for example, between 0.02 inches and 0.5 inches (0.508 mm and 12.7 mm), between 0.03 inches and 0.2 inches (0.762 mm and 5.08 mm), or between 0.05 inches and 0.1 inches (1.27 mm and 2.54 mm).

The pool feed passage 128 may have a feed diameter 142. The feed diameter 142 may be, for example, between 0.02 inches and 0.5 inches (508 millimeters (mm) and 12.7 mm), between 0.05 inches and 0.3 inches (1.27 mm and 7.62 mm), or between 0.1 inches and 0.2 inches (2.54 mm and 5.08 mm).

Figure 3:
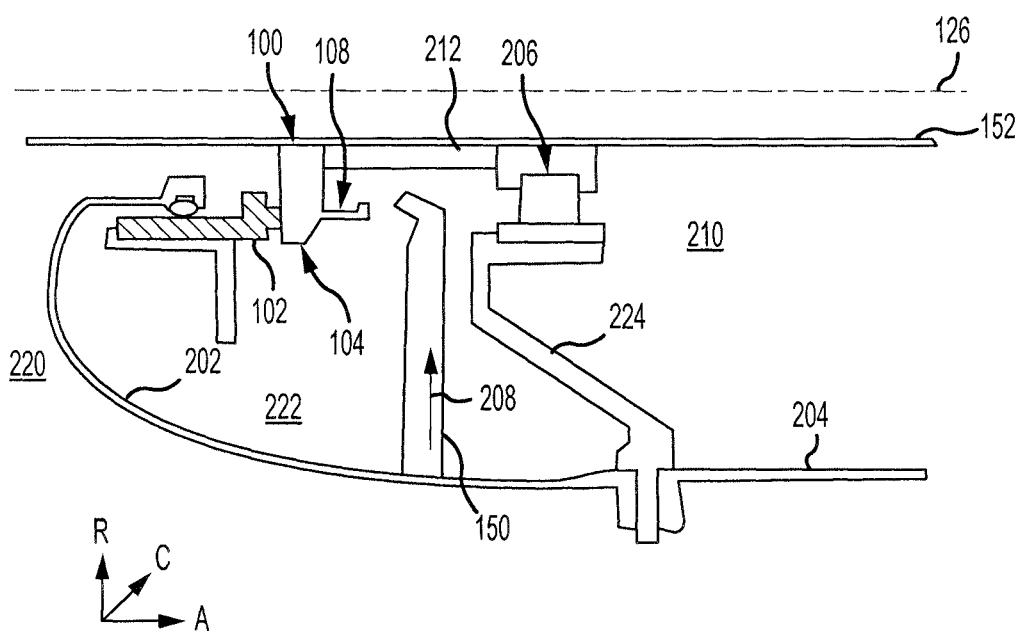
FIG. 3 illustrates an exemplary use of the wet-dry face seal of FIG. 2, in accordance with various embodiments.

Turning now to FIG. 3, an exemplary use of the wet-dry face seal 100 is shown. As shown, the wet-dry face seal 100 abuts against a shaft 152 and provides sealing capabilities for a bearing compartment 210. In particular, the wet-dry face seal 100 seals the bearing compartment 210 from surrounding areas to allow oil to collect and remain within the bearing compartment 210. The wet-dry face seal 100 also seals the bearing compartment 201 from surrounding areas to prevent or minimize air entry. Typically this air is pressurized, elevated in temperature and/or contaminated with environmental debris so its entry into the bearing compartment adversely impacts the performance and efficiency of the bearing compartment. The bearing compartment 210 may be defined between a first bearing compartment housing 202, a second bearing compartment housing 204, and the shaft 152. A bearing 206 and a bearing support 224 may be spaced from the wet-dry face seal 100 by a spacer 212. As shown, the wet-dry face seal 100 (and in particular the oil capture scoop 108) receives oil from the oil jet 150 as shown by an arrow 208.

Figure 4:
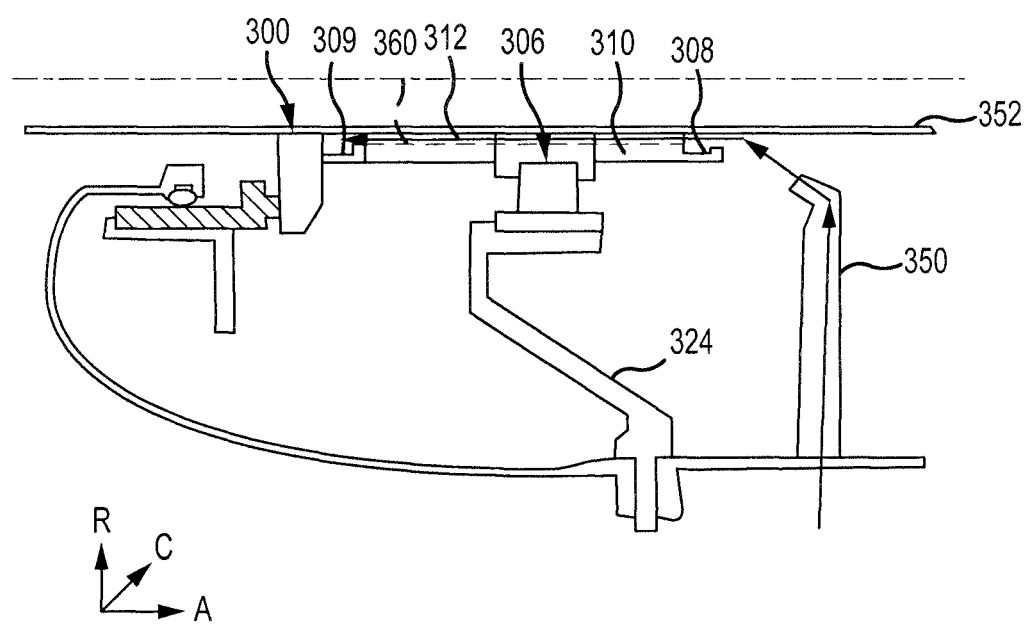
FIG. 4 illustrates an implementation of an exemplary wet-dry face seal, in accordance with various embodiments.

In various embodiments and referring to FIG. 4, a bearing 306 and a bearing support 324 may be located between an oil nozzle 350 and a wet-dry face seal 300. In this arrangement, an oil capture scoop 308, similar to the oil capture scoop 108 of FIG. 2, may be incorporated into the bearing 306 or a spacer 310 or a similar part mounted on a shaft 352. The captured oil may then be transmitted, such as through slots or passages 360 between inner diameters of the bearing 306 and spacer 310, 312 and an outer diameter of the shaft 352, to the wet-dry face seal 300. In such an arrangement, a scoop 309 on the wet-dry face seal 300 may be located radially inward and radially aligned with the spacer 312. Additionally, the radial portion of the scoop 309 may be modified to permit oil to flow through slots or passages in the inner diameter of the spacer 312 to enter the scoop 309.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A wet-dry face seal seat configured to rotate about an axis, comprising:
a main body having a mating face configured to mate with a sealing member and an outer diameter surface, and defining a pool feed passage that extends to the mating face and a cooling hole that extends to the outer diameter surface; and
an oil capture scoop extending from the main body and defining an oil volume radially inward from the oil capture scoop and in fluid communication with the pool feed passage and the cooling hole, the oil capture scoop having a radial distance that allows oil to flow through the cooling hole in response to oil flow from an oil jet being below a threshold value and through the pool feed passage in response to the oil flow from the oil jet reaching or exceeding the threshold value.

2. The wet-dry face seal seat of claim 1, wherein the oil capture scoop includes an axial portion extending away from the main body and a radial portion extending radially inward from the axial portion.

3. The wet-dry face seal seat of claim 2, wherein the oil volume is defined by the axial portion of the oil capture scoop, the radial portion of the oil capture scoop, and an axial face of the main body.

4. The wet-dry face seal seat of claim 3, wherein the axial face of the main body defines a pool feed inlet in fluid communication with the pool feed passage, and the axial portion of the oil capture scoop defines a cooling inlet in fluid communication with the cooling hole.

5. The wet-dry face seal seat of claim 1, wherein the main body defines an oil pool on the mating face in fluid communication with the pool feed passage.

6. The wet-dry face seal seat of claim 5, wherein the pool feed passage includes a pool feed hole extending from the oil volume to the oil pool, and a pool discharge hole extending from the oil pool to the outer diameter surface.

7. The wet-dry face seal seat of claim 1, wherein the wet-dry face seal seat is configured for use in a gas turbine engine.

8. The wet-dry face seal seat of claim 1, wherein the main body and the oil capture scoop include at least one of a metallic material, a non-metallic material, or a hybrid metallic and non-metallic material.

9. The wet-dry face seal seat of claim 1, wherein the wet-dry face seal seat is capable of use with the oil flow from the oil jet increasing in response to a rotational velocity of the wet-dry face seal seat increasing.

10. A wet-dry face seal seat configured to rotate about an axis, comprising:
a main body having a mating face configured to mate with a sealing member, an outer diameter surface, and an axial face, the main body defining a pool feed passage that extends to the mating face and a cooling hole that extends to the outer diameter surface; and
an oil capture scoop having an axial portion extending away from the main body, and a radial portion extending radially inward from the axial portion, the axial portion of the oil capture scoop, the radial portion of the oil capture scoop, and the axial face of the main body defining an oil volume, the axial face of the main body further defining a pool feed inlet in fluid communication with the pool feed passage, and the axial portion of the oil capture scoop defining a cooling inlet in fluid communication with the cooling hole.

11. The wet-dry face seal seat of claim 10, wherein a distance between the axial portion of the oil capture scoop and the pool feed inlet along with the cooling inlet being located on the axial portion allows oil to flow through the cooling hole in response to oil flow from an oil jet being below a threshold value and through the pool feed passage in response to the oil flow from the oil jet reaching or exceeding the threshold value.

12. The wet-dry face seal seat of claim 11, wherein the oil flow from the oil jet increases as a rotational velocity of the wet-dry face seal seat increases.

13. The wet-dry face seal seat of claim 10, wherein the main body defines an oil pool on the mating face in fluid communication with the pool feed passage.

14. The wet-dry face seal seat of claim 13, wherein the pool feed passage includes a pool feed hole extending from the oil volume to the oil pool, and a pool discharge hole extending from the oil pool to the outer diameter surface.

15. The wet-dry face seal seat of claim 10, wherein the wet-dry face seal seat is configured for use in a gas turbine engine.

16. The wet-dry face seal seat of claim 10, wherein the main body and the oil capture scoop include at least one of a metallic material, a non-metallic material, or a hybrid metallic and non-metallic material.

17. A wet-dry face seal, comprising:
a sealing member; and
a wet-dry face seal seat configured to rotate relative to the sealing member and having:
a main body having a mating face configured to mate with the sealing member, an outer diameter surface, and an axial face, the main body defining a pool feed passage that extends to the mating face and a cooling hole that extends to the outer diameter surface, and
an oil capture scoop having an axial portion extending away from the main body, and a radial portion extending radially inward from the axial portion, the axial portion of the oil capture scoop, the radial portion of the oil capture scoop, and the axial face of the main body defining an oil volume, the axial face of the main body further defining a pool feed inlet in fluid communication with the pool feed passage, and the axial portion of the oil capture scoop defining a cooling inlet in fluid communication with the cooling hole.

18. The wet-dry face seal of claim 17, wherein a distance between the axial portion of the oil capture scoop and the pool feed inlet along with the cooling inlet being located on the axial portion allows oil to flow through the cooling hole in response to oil flow from an oil jet being below a threshold value and through the pool feed passage in response to the oil flow from the oil jet reaching or exceeding the threshold value.

19. The wet-dry face seal of claim 17, wherein the main body defines an oil pool on the mating face in fluid communication with the pool feed passage, and the pool feed passage includes a pool feed hole extending from the oil volume to the oil pool, and a pool discharge hole extending from the oil pool to the outer diameter surface.

20. The wet-dry face seal of claim 17, wherein the wet-dry face seal seat is configured for use in a gas turbine engine.

* * * * *